United States Patent
Huang et al.

(10) Patent No.: US 10,630,919 B2
(45) Date of Patent: Apr. 21, 2020

(54) IMAGE SENSING APPARATUS AND BLACK LEVEL CORRECTION METHOD THEREOF AND COMPUTER READABLE MEDIUM

(71) Applicant: Novatek Microelectronics Corp., Hsinchu (TW)

(72) Inventors: Ming-Teng Huang, Hsinchu (TW); Yi-Jen Wu, Hsinchu County (TW)

(73) Assignee: Novatek Mircoelectronics Corp., Hsinchu (TW)

( * ) Notice: Subject to any disclaimer, the term of this patent is extended or adjusted under 35 U.S.C. 154(b) by 66 days.

(21) Appl. No.: 15/889,156

(22) Filed: Feb. 5, 2018

(65) Prior Publication Data
US 2019/0246052 A1    Aug. 8, 2019

(51) Int. Cl.
*H04N 5/357* (2011.01)
*G06T 7/80* (2017.01)
*H04N 5/361* (2011.01)

(52) U.S. Cl.
CPC ............. *H04N 5/357* (2013.01); *G06T 7/80* (2017.01); *H04N 5/361* (2013.01)

(58) Field of Classification Search
None
See application file for complete search history.

(56) References Cited

U.S. PATENT DOCUMENTS

| | | | |
|---|---|---|---|
| 4,343,021 A | 8/1982 | Frame | |
| 6,927,795 B1 | 8/2005 | Cazier et al. | |
| 2005/0093991 A1* | 5/2005 | Yokohata | H04N 5/361 348/222.1 |
| 2006/0262210 A1* | 11/2006 | Smith | H04N 5/3651 348/308 |
| 2008/0297816 A1* | 12/2008 | Nikkanen | H04N 5/361 358/1.9 |
| 2012/0133803 A1* | 5/2012 | Lee | H04N 5/361 348/243 |
| 2014/0029065 A1* | 1/2014 | Nakazawa | H04N 1/407 358/461 |
| 2014/0313378 A1* | 10/2014 | Yuen | H04N 5/365 348/272 |
| 2015/0116533 A1* | 4/2015 | Hsu | H04N 5/361 348/223.1 |

* cited by examiner

*Primary Examiner* — Quan Pham
(74) *Attorney, Agent, or Firm* — JCIPRNET

(57) ABSTRACT

An image sensing apparatus, a black level correction method thereof, and a computer readable medium are provided. The image sensing apparatus comprises a pixel array and a black level correction circuit, and the pixel array comprises an optical black area and an active area. The black level correction circuit generates a black offset with respect to a pixel in the active area according to a plurality of reference black offsets with respect to a plurality of reference pixels which are neighboring the pixel and a ratio determined according to a current thermal noise information and a reference thermal noise information. The black level correction circuit generates a corrected pixel data of the pixel according to original pixel data of the pixel and the black offset.

19 Claims, 2 Drawing Sheets

IMAGE SENSING APPARATUS AND BLACK LEVEL CORRECTION METHOD THEREOF AND COMPUTER READABLE MEDIUM

BACKGROUND

Field of the Invention

The invention relates to an image sensing technique and more particularly, to an image sensing apparatus and a black level correction method therefor and a computer readable medium.

Description of Related Art

An image sensing apparatus has been applied in various electronic products, such as cell-phone cameras, digital still cameras (DSCs), digital video (DV) apparatuses, notebook computer (NB) cameras, personal computer (PC) computers, surveillance systems, car video apparatuses (e.g., event data recorders (EDRs), reversing video devices (RVDs) and so on) or other electronic products. The image sensing apparatus is capable of sensing intensity of an ambient light source, converting light energy into electricity and outputting the electricity to form an image.

Generally, when the image sensing apparatus is used to capture/sense an image, even though no light is incident on a pixel array of an image sensor, noise may still appear to the image captured by the pixel array due to a dark current. Thermal energy is the main factor that makes the dark current increase. When the image sensing apparatus keeps outputting images, not only the pixel array, but also peripheral circuits of the pixel array generate heat, which leads to the increase an environmental temperature of the pixel array. As the environmental temperature increases, thermal noise increases so that the dark current increases as well, and as a result black levels of the image also increases. In order to remove undesired increase in black levels from an image, it is necessary to adaptively perform a black level calibration/control operation on the image.

In addition, when an operating temperature of the pixel array increases, different areas of the pixel array are usually heated in different degrees. In the pixel array, a hotter area generates greater thermal noise and thus, generates higher black levels, while a cooler area generates less thermal noise, and thus, generates lower black levels. At a high temperature, different areas in the image usually have significantly different black levels due to the presence of the thermal noise, which results in undesired color shift in the image areas. The more serious the thermal noise is, the more obvious the color shift is in the image area. Thus, it is necessary to adaptively perform a black level calibration/control operation on the image.

SUMMARY

The invention provides an image sensing apparatus, a black level correction method and a computer readable medium capable of adaptively performing a black level calibration/control operation.

According to an embodiment of the invention, a black level correction method of an image sensing apparatus is provided. The image sensing apparatus includes a pixel array including an optical black area and an active area. The black level correction method includes: generating a black offset with respect to a pixel in the active area according to a plurality of reference black offsets with respect to a plurality of reference pixels neighboring the pixel and a ratio, wherein the ratio is determined according to current thermal noise information and reference thermal noise information; and generating corrected pixel data of the pixel according to original pixel data of the pixel and the black offset.

According to an embodiment of the invention, a non-transitory computer readable medium in an image sensing apparatus is provided. The image sensing apparatus includes a pixel array including an optical black area and an active area. The non-transitory computer readable medium stores a program code configured to execute a plurality of operations. The operations include: generating a black offset with respect to a pixel in the active area according to a plurality of reference black offsets with respect to a plurality of reference pixels neighboring the pixel and a ratio, wherein the ratio is determined according to current thermal noise information and reference thermal noise information; and generating corrected pixel data of the pixel according to original pixel data of the pixel and the black offset.

According to an embodiment of the invention, an image sensing apparatus is provided. The image sensing apparatus includes a pixel array, a reading circuit and a black level correction circuit. The pixel array includes an optical black area and an active area. The reading circuit is coupled to the pixel array. The reading circuit is configured to generate a plurality of original pixel data of a plurality of pixels in the active area and generate a plurality of black level values of a plurality of pixels in the optical black area. The black level correction circuit is coupled to the reading circuit to receive original pixel data of one of the pixels in the active area. The black level correction circuit is configured to generate a black offset with respect to the pixel according to a plurality of reference black offsets with respect to a plurality of reference pixels neighboring the pixel and a ratio. The ratio is determined according to current thermal noise information and reference thermal noise information. The black level correction circuit is also configured to generate corrected pixel data of the pixel according to the original pixel data of the pixel and the black offset.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
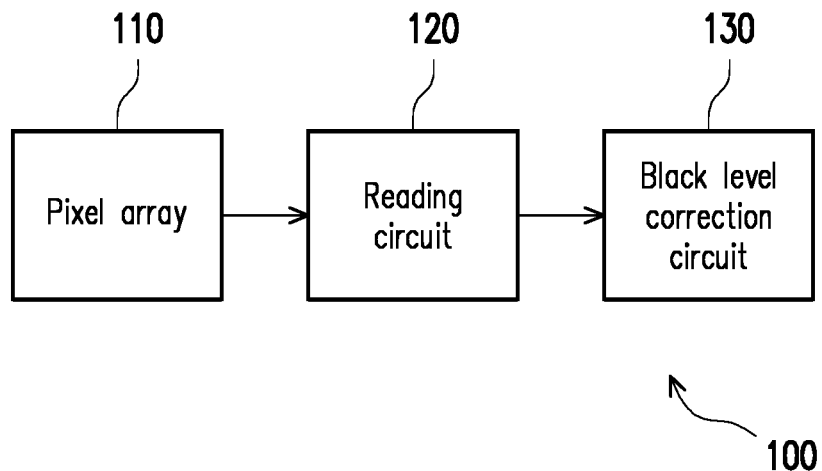
FIG. 1 is a schematic circuit block diagram illustrating an image sensing apparatus according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic circuit block diagram illustrating an image sensing apparatus 100 according to an embodiment of the invention. The image sensing apparatus 100 is, for example, a complementary metal oxide semiconductor (CMOS) sensor, a charge coupled device (CCD) sensor, or other image sensor utilizing a pixel array (e.g., a sensor array). The type of the image sensing apparatus 100 is not limited in the invention. The image sensing apparatus 100 includes a pixel array 110, a reading circuit 120 and a black level correction circuit 130.

The pixel array 110 includes an optical black area and an active area. The optical black area includes a plurality of optical black pixels, and the active area includes a plurality of active pixels. The optical black pixels and the active pixels may be implemented by using a CMOS, a CCD or other techniques. The layout manners of the pixels in the optical black area and the active area are not limited in the present embodiment. For example, in some embodiments, the pixels in the optical black area of the pixel array 110 are surrounding to the active area of the pixel array 110 in a row and/or a column manner. In some other embodiments, the optical black area of the pixel array 110 may be disposed at a side of the active area of the pixel array 110 or may be located at another position of the pixel array 110. Based on a design requirement, in some embodiments, the pixel array 110 may be a conventional pixel array and thus, will be not repeatedly described hereinafter.

The pixels in the active area of the pixel array 110 may include red (R), green (G) and blue (B) pixels configure to receive/sense light signals of images. A structure of the pixels in the optical black area is the same as (or similar to) a structure of the pixels in the active area, but the pixels in the optical black area is covered by an optical black layer (which is made of, for example, a metal or other light-blocking materials) and are incapable of receiving/sensing the light signals. The pixels in the optical black area which are not irradiated by any light may be used to detect the black level induced by the dark current.

The reading circuit 120 is coupled to the pixel array 110. The reading circuit 120 may convert current signals outputted by pixels in the active area and the optical black area of the pixel array 110 to generate a plurality of original pixel data of a plurality of pixels in the active area of the pixel array 110 and generate a plurality of black level values of a plurality of pixels in the optical black area of the pixel array 110.

The black level correction circuit 130 is coupled to the reading circuit 120 to receive the original pixel data of the pixels in the active area of the pixel array 110 and the black level values of the pixels in the optical black area of the pixel array 110. In order to remove the undesired increase in black levels which is caused by thermal noise from an image, the black level correction circuit 130 may adaptively perform a black level calibration/control operation on the image. The black level correction circuit 130 may determine a ratio according to current thermal noise information (i.e., current thermal index) and reference thermal noise information (i.e., reference thermal index). For a pixel (called a current pixel hereinafter) in the active area, the black level correction circuit 130 may generate a black offset with respect to the current pixel according to a plurality of reference black offsets and the ratio. The plurality of reference black offsets is with respect to a plurality of reference pixels neighboring the current pixel. For each pixel, its neighboring reference pixels may be not the same from the other pixel's neighboring reference pixels. The black level correction circuit 130 may generate corrected pixel data of the current pixel according to the original pixel data of the current pixel and the black offset with respect to the current pixel.

Figure 2:
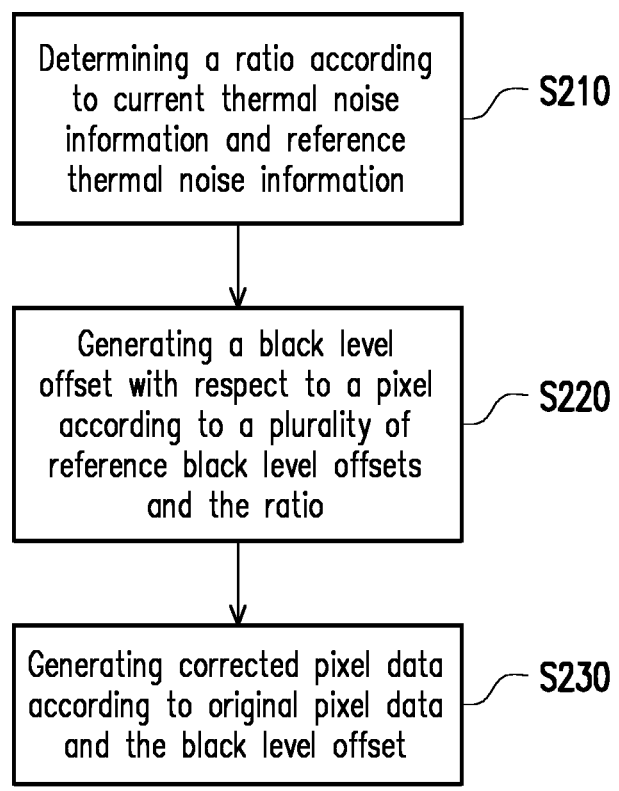
FIG. 2 is a flowchart illustrating a black level correction method of the image sensing apparatus according to an embodiment of the invention.

FIG. 2 is a flowchart illustrating a black level correction method of the image sensing apparatus according to an embodiment of the invention. Referring to FIG. 1 and FIG. 2, in step S210, the black level correction circuit 130 may determine a ratio according to the current thermal noise information (i.e., the current thermal index) and the reference thermal noise information (i.e., the reference thermal index).

It is noted that the current thermal noise information and the reference thermal noise information are calculated in the same way under different operating conditions. The current thermal noise information is determined under normal operation of the image sensing apparatus. The reference thermal noise information may be determined under a predetermined high temperature. The current thermal noise information and the reference thermal noise information may be an arithmetic value calculated based on two representative black levels which can present uniformity of black levels of the optical black area. The following is an example of determining the reference thermal noise information. For instance, at a predetermined high temperature (which is determined by a designer), the pixel array 110 is shielded (from being irradiated by the light), and then, the reading circuit 120 may receive signals from the pixel array 110 and generate data, of the active area, i.e., pixel data, and also generate data of the optical black area, i.e., black level values. In such a condition, a plurality of black level values (black levels) of part of (or all of) of the pixels in the optical black area generated under the high-temperature may be used to calculate the reference thermal noise information. For example (but not limited to), the optical black area may consist of a plurality of optical black regions, and the two representative black levels are calculated based on the black levels of the optical black regions, or selected from the black levels of the optical black regions. The calculation of the representative black levels may be determined based on a design requirement.

In some embodiments, a representative black level refers to the greatest average black level among all of average black levels of the optical black regions of the optical black area, and the other representative black level refers to the smallest average black level among the average black levels of the optical black regions. In some other embodiments, a representative black level is a maximum value selected from the plurality of black levels of the optical black area, and the other representative black level is a minimum value selected from the plurality of black levels of the optical black area. After the two representative black levels, a first representative black level B01 and a second representative black level B02, are obtained, an arithmetic value is calculated based on the first representative black level B01 and the second representative black level B02, and the arithmetic value is employed as the reference thermal noise information. In some embodiments, the reference thermal noise information may be (k01*B01−k02*B02), wherein the coefficient k01 and the coefficient k02 may be arbitrary real numbers determined based on a design requirement. In some other embodiments, the reference thermal noise information may be (k01*B01)/(k02*B02). After the reference thermal noise information is obtained, the reference thermal noise information may be provided to the black level correction circuit 130 in advance for being used in the black level correction which is executed in a normal operation of the image sensing apparatus.

In the normal operation, the operating temperature (i.e., the current temperature) of the pixel array 110 is usually higher than an environmental temperature (i.e., a room temperature), but lower than the aforementioned predetermined high temperature which is set for obtaining reference thermal noise information. At the current temperature, the reading circuit 120 may receive signals sensed by the pixel array 110 and generate pixel data of the active area and also generate black level values of the optical black area. The black level correction circuit 130 may calculate the current thermal noise information by using the same way the reference thermal noise information is calculated. The black level correction circuit 130 may calculate representative black levels, which are a first representative black level B11 and a second representative black level B12. The black level correction circuit 130 may calculate an arithmetic value according to the first representative black level B11 and the second representative black level B12 and employ the arithmetic value as the current thermal noise information (i.e., the current thermal index). In some embodiments, the arithmetic value includes a difference between the first representative black level B11 and the second representative black level B12. In yet other embodiments, the current thermal noise information may be (k11*B11−k12*B12), wherein the coefficient k11 and the coefficient k12 may be arbitrary real numbers determined based on a design requirement. In some other embodiments, the arithmetic value includes a ratio of the first representative black level B11 to the second representative black level B12. In still other embodiments, the current thermal noise information may be (k11*B11)/(k12*B12). The calculation of the current thermal noise information may be inferred with reference to the related description of the reference thermal noise information and thus, will not be repeated.

After calculating the current thermal noise information, the black level correction circuit 130 may determine a ratio according to the current thermal noise information and the reference thermal noise information. For example (but not limited to), the aforementioned ratio may be a quotient obtained by the current thermal noise information divided by the reference thermal noise information.

Referring to FIG. 1 and FIG. 2, in step S220, the black level correction circuit 130 may generate a black offset with respect to the current pixel according to a plurality of reference black offsets with respect to a plurality of reference pixels neighboring the current pixel in the active area of the pixel array 110 and the ratio. The plurality of reference black offsets are a part of a predetermined reference black offset table which may be stored in a memory unit of the image sensing apparatus. The reference black offset table includes m*n reference black offsets with respect to m*n pixels in the pixel array 110, referred to as m*n reference pixels, and the reference pixels may be (but not limited to) respectively set to be center pixels in m*n regions of the active area of the pixel array 110. The m*n regions of the active area are respectively corresponding to m*n regional black levels. A target black level subtracts a respective regional black level to generate each of the m*n reference black offsets. The regional black levels are measured under a predetermined high temperature. The target black level is measured under a specific temperature which makes the black levels of the entire image uniform, e.g., a room temperature. For instance, at a predetermined initial temperature (which may be around room temperature), the pixel array 110 is shielded (from being irradiated by the light) and the reading circuit 120 may generate an image where pixel data with respect to each pixel is a black level. The temperature may be adjusted until finding a specific temperature under which black levels of the entire image may be approximately uniform. When the black levels of the entire image are approximately uniform, such a black level may be employed as the target black level.

The regional black levels may be measured by the following example. At the predetermined high temperature, the pixel array 110 is shielded (from being irradiated by the light), and then, the reading circuit 120 may generate an image where pixel data with respect to each pixel is a black level measured under the predetermined high temperature. This image may be divided into m*n image blocks (corresponding to the m*n regions of the active area), and each of the m*n regional black levels may be the average black level of each respective image block.

In an example, it is assumed that a size of the active area of the pixel array 110 contains 40*20 pixels, and it is further assumed that a reference black offset look-up table capable of storing 4*2=8 reference black offsets is provided. An image obtained by shielding the pixel array 110 from being irradiated by the light at the predetermined high temperature may be divided into 4*2 image blocks (corresponding to 4*2 regions of the active area), and data of each image block are 10*10=100 black level values with respect to 10*10 pixels. Thereafter, an average black level of each image block is calculated, thereby obtaining 4*2 average black levels. Each of the 4*2 average black levels is subtracted from the target black level, thereby, obtaining 4*2 reference black offsets. The 4*2 reference black offsets are stored in the reference black offset look-up table. The 4*2 reference black offsets may be employed as reference black offsets with respect to the 4*2 reference pixels which are center pixels of 4*2 regions of the active area. For example, a coordinate of the center pixel of an image block at the top left of the image is (5, 5). If the target black level is 64 and an average black level of the top-left image block is 70, the recorded reference black offset corresponding to the top-left image block is 64−70=−6. Other reference black offsets and the corresponding reference pixel coordinates thereof may be derived by the same way. After the reference black offset look-up table is obtained, the reference black offset look-up table may be provided to the black level correction circuit 130 in advance for being used in the black level correction executed in the normal operation of the image sensing apparatus.

Figure 3:
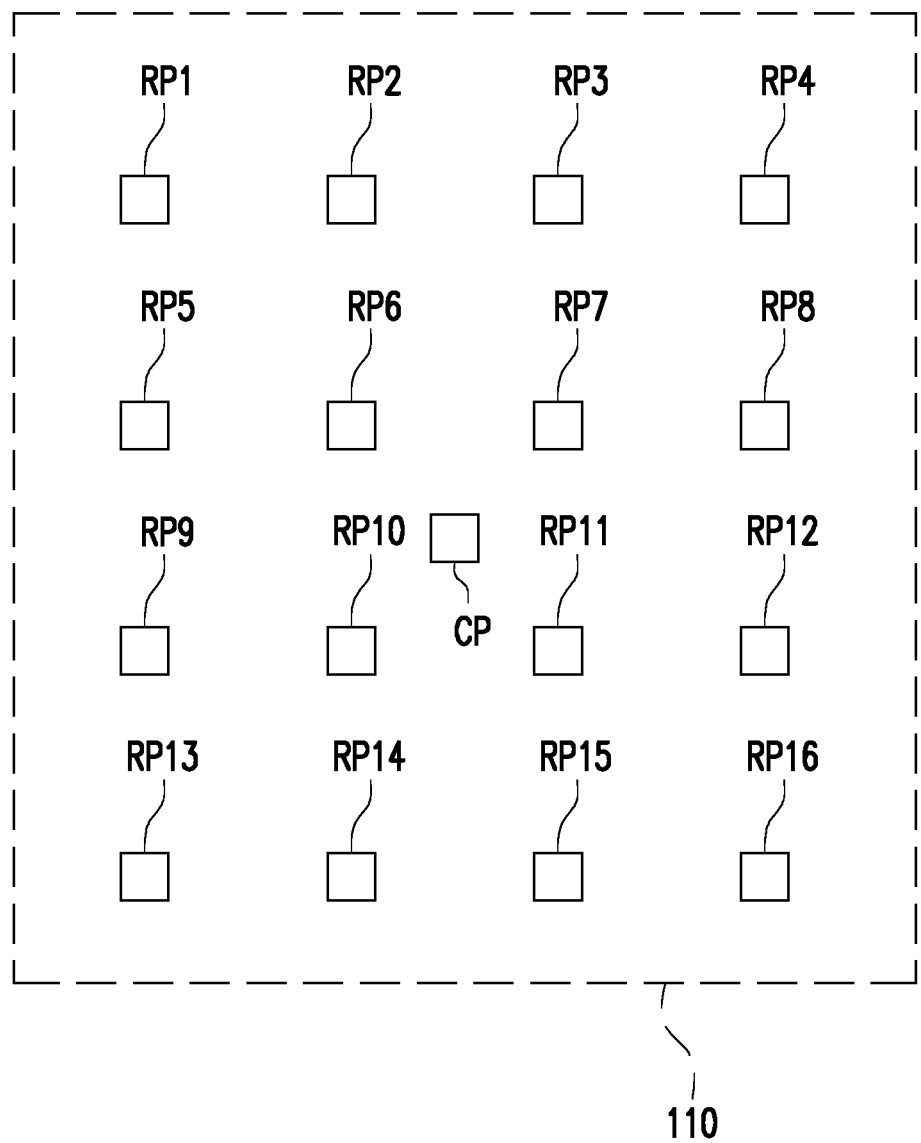
FIG. 3 is a schematic diagram illustrating a current pixel and a plurality of reference pixels neighboring the current pixel in the active area of a pixel array.

FIG. 3 is a schematic diagram illustrating a current pixel CP and 16 neighboring reference pixels RP1 to RP16 in the active area of the pixel array 110. It is noted that the reference pixels RP1 to RP16 are part of all the reference pixels. Positions and reference black offsets with respect to the reference pixels RP1 to RP16 may be obtained from the look-up table.

In some embodiments, the black level correction circuit 130 may generate a plurality of calibrated reference black offsets respectively by multiplying the reference black offsets with respect to the plurality of reference pixels neighboring the current pixel CP (e.g., RP1 to RP16) by the ratio which is the current thermal noise information divided by the reference thermal noise information. After obtaining the calibrated reference black offsets the black level correction circuit 130 may generate the black offset with respect to the current pixel CP according to the calibrated reference black offsets with respect to the reference pixels. The black level correction circuit 130 may perform an interpolation calculation by using the calibrated reference black offsets with respect to the reference pixels RP1-RP16 so as to generate the black offset with respect to the current pixel CP. In another example, the black level correction circuit 130 may perform a polynomial calculation by using the calibrated reference black offsets with respect to the reference pixels RP1 to RP16, instead of performing the interpolation calculation, to generate the black offset with respect to the current pixel CP.

In some other embodiments, the black level correction circuit 130 may generate a first reference black offset with respect to the current pixel CP according to the plurality of reference black offsets with respect to the plurality of reference pixels neighboring the current pixel CP (e.g., RP1 to RP16). For instance, the black level correction circuit 130 may perform the interpolation calculation by using the reference black offsets with respect to the plurality of reference pixels RP1 to RP16 neighboring the current pixel CP to generate the first reference black offset with respect to the current pixel CP. In another example, the black level correction circuit 130 may perform a polynomial calculation by using the reference black offsets with respect to the reference pixels RP1 to RP16, instead of performing the interpolation calculation, to generate the first black offset with respect to the current pixel CP. After obtaining the first reference black offset, the black level correction circuit 130 may generate the black offset with respect to the current pixel CP by multiplying the first reference black offset by the ratio.

Referring to FIG. 1 and FIG. 2, in step S230, the black level correction circuit 130 may generate corrected pixel data of the current pixel CP according to original pixel data of the current pixel CP and the black offset with respect to the current pixel CP. For example (but not limited to), the black level correction circuit 130 may add the black offset with respect to the current pixel CP to the original pixel data of the current pixel CP to generate the corrected pixel data of the current pixel CP.

Accordingly, the image sensing apparatus 100 and the black level correction method of the embodiments set forth above can use the plurality of reference black offsets with respect to the plurality of reference pixels at different positions of the active area of the pixel array 110. Besides, the image sensing apparatus 100 and the black level correction method of the embodiments set forth above can further determine the ratio according to the current thermal noise information (i.e., the current thermal index) and the reference thermal noise information (i.e., the reference thermal index). According to the reference black offsets and the ratio, the black offset with respect to the current pixel can be determined. The original pixel data of the current pixel can be calibrated based on the black offset to generate the corrected pixel data of the current pixel. Therefore, the image sensing apparatus 100 and the black level correction method of the embodiments set forth above can adaptively perform the black level calibration/control operation.

It should be noted that in various application scenarios, related functions of the black level correction circuit 130 may be implemented as software, firmware or hardware by using general purpose programming languages (e.g., C or C++), hardware description languages (e.g., Verilog HDL or VHDL) or other suitable programming languages. The programming languages capable of executing the functions may be deployed in any computer-accessible media, such as magnetic tapes, semiconductor memories, magnetic disks or compact disks (e.g., CD-ROM or DVD-ROM) or may be delivered through the Internet, wired communication, wireless communication or other communication media. The programming languages may be stored in the computer-accessible media for a processor of the computer to access/execute the programming codes of the software (or firmware). In the hardware implementation, the functions of the embodiments of the invention can be implemented or executed by one or more controllers, microcontrollers, microprocessors, application-specific integrated circuits (ASICs), digital signal processors (DSPs), field programmable gate array (FPGAs) and/or other various logical blocks, modules and circuits of other processing units. In addition, the device and the method of the invention can be implemented through a combination of hardware and software.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A black level correction method of an image sensing apparatus, wherein the image sensing apparatus comprises a pixel array, and the pixel array comprises an optical black area and an active area, the black level correction method comprising:

generating a black offset with respect to a first pixel in the active area according to a plurality of reference black offsets with respect to a plurality of reference pixels neighboring the first pixel and a ratio, wherein the active area comprises a plurality of regions, each of the regions includes a plurality of pixels, and each of the reference pixels is one of the pixels in each of the regions, wherein the ratio is determined according to current thermal noise information and reference thermal noise information; and generating corrected pixel data of the first pixel according to original pixel data of the first pixel and the black offset.

2. The black level correction method according to claim 1, wherein the step of generating the black offset comprises:

generating a plurality of calibrated reference black offsets by respectively multiplying the plurality of reference black offsets with respect to the plurality of reference pixels neighboring the first pixel by the ratio; and generating the black offset with respect to the first pixel according to the plurality of calibrated reference black offsets with respect to the plurality of reference pixels.

3. The black level correction method according to claim 1, wherein the step of generating the black offset comprises:

generating a first reference black offset with respect to the first pixel according to the plurality of reference black offsets with respect to the plurality of reference pixels neighboring the first pixel; and generating the black offset by multiplying the first reference black offset by the ratio.

4. The black level correction method according to claim 1, further comprising:

calculating a plurality of representative black levels corresponding to a plurality of regions of the optical black area;

calculating an arithmetic value based on a first representative black level and a second representative black level selected from the plurality of representative black levels; and employing the arithmetic value as the current thermal noise information.

5. The black level correction method according to claim 4, wherein each of the representative black levels is an average value of a plurality of black levels with respect to a plurality of pixels in one of the regions of the optical black area.

6. The black level correction method according to claim 4, wherein the arithmetic value comprises a difference between the first representative black level and the second representative black level or a ratio of the first representative black level to the second representative black level.

7. A non-transitory computer readable medium in an image sensing apparatus, wherein the image sensing apparatus comprises a pixel array, and the pixel array comprises an optical black area and an active area, the non-transitory computer readable medium storing a program code configured to execute a plurality of operations comprising:

generating a black offset with respect to a pixel in the active area according to a plurality of reference black offsets with respect to a plurality of reference pixels neighboring the first pixel and a ratio, wherein the ratio is determined according to current thermal noise information and reference thermal noise information; and generating corrected pixel data of the first pixel according to original pixel data of the first pixel and the black offset, wherein the active area comprises a plurality of regions, each of the regions includes a plurality of pixels, and each of the reference pixels is one of the pixels in each of the regions.

8. The non-transitory computer readable medium according to claim 7, wherein the operation of generating the black offset executed according to the program code comprises:

generating a plurality of calibrated reference black offsets by respectively multiplying the plurality of reference black offsets with respect to the plurality of reference pixels neighboring the first pixel by the ratio, and generating the black offset with respect to the first pixel according to the plurality of calibrated reference black offsets with respect to the plurality of reference pixels.

9. The non-transitory computer readable medium according to claim 7, wherein the operation of generating the black offset executed according to the program code comprises:

generating a first reference black offset with respect to the first pixel according to the plurality of reference black offsets with respect to the plurality of reference pixels neighboring the first pixel; and generating the black offset by multiplying the first reference black offset by the ratio.

10. The non-transitory computer readable medium according to claim 7, wherein the operations executed by the program code further comprises:

calculating a plurality of representative black levels corresponding to a plurality of regions of the optical black area;

calculating an arithmetic value based on a first representative black level and a second representative black level selected from the plurality of representative black levels; and employing the arithmetic value as the current thermal noise information.

11. The non-transitory computer readable medium according to claim 10, wherein each of the representative black levels is an average value of a plurality of black levels with respect to a plurality of pixels in one of the regions of the optical black area.

12. The non-transitory computer readable medium according to claim 10, wherein the arithmetic value comprises a difference between the first representative black level and the second representative black level or a ratio of the first representative black level to the second representative black level.

13. An image sensing apparatus, comprising:

a pixel array, comprising an optical black area and an active area;

a reading circuit, coupled to the pixel array, and configured to generate a plurality of original pixel data of a plurality of pixels in the active area and a plurality of black level values of a plurality of pixels in the optical black area; and a black level correction circuit, coupled to the reading circuit to receive original pixel data of a first pixel in the active area, and configured to generate a black offset with respect to the first pixel according to a plurality of reference black offsets with respect to a plurality of reference pixels neighboring the first pixel and a ratio, and generates corrected pixel data of the first pixel according to the original pixel data of the first pixel and the black offset, wherein the active area comprises a plurality of regions, each of the regions includes a plurality of pixels, and each of the reference pixels is one of the pixels in each of the regions, wherein the ratio is determined according to current thermal noise information and reference thermal noise information.

14. The image sensing apparatus according to claim 13, wherein the plurality of reference black offsets with respect to the plurality of reference pixels are stored in the image sensing apparatus.

15. The image sensing apparatus according to claim 13, wherein the black level correction circuit is configured to generate a plurality of calibrated reference black offsets by respectively multiplying the plurality of reference black offsets with respect to the plurality of reference pixels neighboring the first pixel by the ratio and generate the black offset with respect to the first pixel according to the plurality of calibrated reference black offsets with respect to the plurality of reference pixels.

16. The image sensing apparatus according to claim 13, wherein the black level correction circuit is configured to generate a first reference black offset with respect to the first pixel according to the plurality of reference black offsets with respect to the plurality of reference pixels neighboring the first pixel and generate the black offset by multiplying the first reference black offset by the ratio.

17. The image sensing apparatus according to claim 13, wherein the black level correction circuit is further configured to:

calculate a plurality of representative black levels corresponding to a plurality of regions of the optical black area;

calculate an arithmetic value based on a first representative black level and a second representative black level selected from the plurality of representative black levels, and employ the arithmetic value as the current thermal noise information.

18. The image sensing apparatus according to claim 17, wherein each of the representative black levels is an average value of a plurality of black levels with respect to a plurality of pixels in one of the regions of the optical black area.

19. The image sensing apparatus according to claim 17, wherein the arithmetic value comprises a difference between the first representative black level and the second representative black level or a ratio of the first representative black level to the second representative black level.

* * * * *